United States Patent [19]
Henley

[11] Patent Number: 5,692,763
[45] Date of Patent: Dec. 2, 1997

[54] SWING-POWERED VEHICLE

[76] Inventor: James C. Henley, 3511 E. Baseline #1069, Phoenix, Ariz. 85040-7228

[21] Appl. No.: 588,398

[22] Filed: Jan. 18, 1996

[51] Int. Cl.[6] .................................................. B62M 1/18
[52] U.S. Cl. ..................... 280/226.1; 280/218; 280/1.191
[58] Field of Search ..................................... 280/218, 220, 280/221, 226.1, 1.191, 1.183; 482/24, 69, 66; 446/458, 468, 278, 320

[56] References Cited

U.S. PATENT DOCUMENTS

| | | | |
|---|---|---|---|
| 1,751,316 | 3/1930 | Franklin | 280/226.1 |
| 2,418,368 | 4/1947 | Schroeder | 280/218 |
| 2,729,464 | 1/1956 | O'Donnell | 280/218 |
| 2,885,213 | 5/1959 | Glumer | 280/1.183 |
| 4,076,269 | 2/1978 | Muguruma | 280/218 |
| 4,230,331 | 10/1980 | Johnson | 280/218 |
| 4,783,091 | 11/1988 | Chi | 280/218 |
| 4,796,907 | 1/1989 | Geller | 280/220 |
| 4,846,488 | 7/1989 | Szadkowski | 280/221 |
| 5,255,697 | 10/1993 | Grauer | 482/66 |

*Primary Examiner*—Brian L. Johnson
*Assistant Examiner*—Gary Savitt
*Attorney, Agent, or Firm*—Patent & Trademark Services, Inc.; Joseph H. McGlynn

[57] ABSTRACT

A swing propelled vehicle, having a frame set on wheels, a swing device, a steerable axle, and a braking wedge to prevent the wheels from turning in more than one direction. The vehicle is propelled by the momentum generated by the swinging motion, and the braking wedge prevents back-and-forth oscillation of the vehicle, affording forward progress. The direction of travel can be reversed by switching the braking wedge from the front of the wheel to the back and vice versa. The occupant can steer the vehicle by means of a handle that attaches to cables on a pivotally mounted axle.

1 Claim, 2 Drawing Sheets

SWING-POWERED VEHICLE

BACKGROUND OF THE INVENTION

The present invention relates generally to vehicles propelled by the occupant, and more particularly to a vehicle having a pendulum-type swing device for its means of locomotion.

DESCRIPTION OF THE PRIOR ART

In the prior art various types of different rider-propelled vehicles have been proposed. Aside from the familiar chain driven bicycle, other vehicles employing the body motions of the rider are known. For example, U.S. Pat. No. 4,230,331 discloses a toy vehicle that is propelled by pivotal movement of the rider's hips and legs. U.S. Pat. No. 4,076,269 describes a cycle that is propelled by a mechanism that responds to lateral movements of the rider's arms. Other inventions have provided toy vehicles that respond to the up and down shifting of the rider's weight, such as those described in U.S. Pat. Nos. 2,418,368 and 2,729,464.

The prior art vehicles, however, are either designed exclusively for use by children, or else they do not provide a means of locomotion that is itself an enjoyable form of exercise. The present invention is distinctive from the prior art vehicles in that it provides a means of locomotion, namely swinging, that is a safe, enjoyable, and healthful activity for persons of all ages.

SUMMARY OF THE INVENTION

The invention disclosed herein is a vehicle, consisting of a frame set on wheels, with a centrally mounted swing device providing the means of propulsion. The rider swings back and forth, generating the vehicle's momentum. A braking device mounted to one or more of the wheels allows the wheels to move in only one direction at a time, to prevent back-and-forth oscillation and, thereby, allow forward progress. The direction of travel can be reversed by pulling a handle mounted on the frame. The vehicle has a pivoting back axle connected by wires to a movable handle on the swing mechanism, allowing the rider to steer the vehicle.

The vehicle is safe for use by all ages because its speed is limited, and because the frame is wide and low to the ground. The wheels are mounted interiorly to the frame, to prevent interference with the wheels by objects on the ground. Bumpers on the front and back of the vehicle further enhance its safety.

It is an object of the present invention to provide an improved rider propelled vehicle.

It is an object of the present invention to provide an improved rider propelled vehicle that is safe and enjoyable for persons of all ages.

It is an object of the present invention to provide an improved rider propelled vehicle having a swing device as its means of locomotion.

It is an object of the present invention to provide an improved rider propelled vehicle that consists of a frame mounted on wheels, a swing device, a unidirectional braking device, and a steerable back axle.

These and other objects and advantages of the present invention will be fully apparent from the following description, when taken in connection with the annexed drawings.

DESCRIPTION OF THE PREFERRED EMBODIMENT

Figure 1:
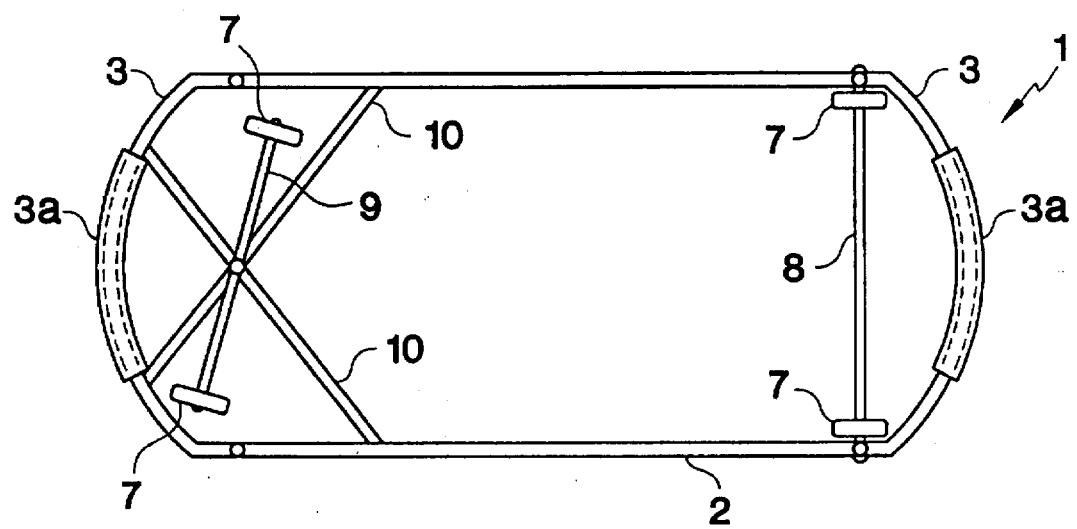
FIG. 1 shows a top view of the invention, with the upper portion of the frame omitted for clarity.
Figure 2:
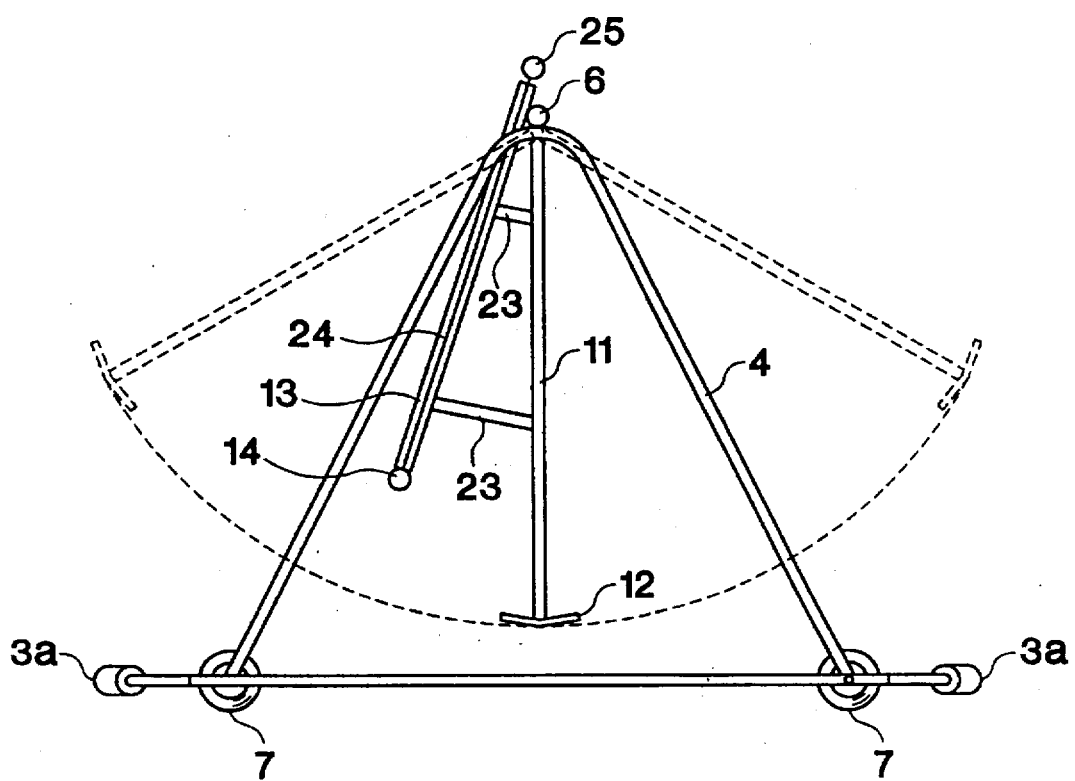
FIG. 2 shows a side view of the invention.

Referring now to the drawings in greater detail, FIG. 1 shows the vehicle of the present invention 1 having a frame with a generally rectangular bottom defined by longitudinal rails 2 and transverse members 3. As shown in FIGS. 2 said frame is further defined by a substantially upright triangular frame members 4 and cross bar support members 6. The frame of the vehicle can be constructed from wood, lightweight metal, or any other suitable material.

The dimensions of the frame are not material, although the bottom portion of the frame is preferably wide enough to prevent the vehicle from flipping over, and should be set low to the ground for safety. As depicted in FIGS. 1 and 2, padded bumpers 3a of foam rubber, or similar material, could be attached to transverse members 3 in order to further enhance the safety of the vehicle. The padded bumpers could be made as a sleeve and attached to transverse members 3 before the members 3 are attached to the longitudinal rails 2, or they could be made as a split sleeve and attached later by, for example, gluing.

As depicted in FIG. 1, the vehicle is set on wheels 7 which are mounted on the axles 8, 9. The wheels are preferably set interiorly to the frame members 2, 3 to minimize obstruction from objects on the ground. A stationary axle 8 is rigidly mounted between the longitudinal rails 2 by any conventional means. The steering axle 9 is pivotally mounted at the intersection of steering support members 10 by any conventional means. Cables attached at either end of the steering axle connect to the steering rod 25 at the top of the frame, as described more fully below.

As shown in FIG. 2, a conventional swing, having upright members 11 and a seat 12, is hingedly connected to the cross bar 6 at the apex of the frame. The attachment means has been omitted for clarity, but any conventional clamp that will securely attach the upright members 11 to the cross bar 6 and allow the upright members 11 to swing with respect to the cross bar can be used. Attached to the upright swing members 11 by connecting rods 23 is a hollow tube 13. Within tube 13 is a steering shaft 24 which is fixedly attached at one end to handle 14. At the other end steering shaft 24 is attached to a steering rod 25. Since the steering shaft 24 is smaller than hollow tube 13, turning the handle 14 from left to right and back again will turn steering rod 25 in the same direction.

Figure 4:
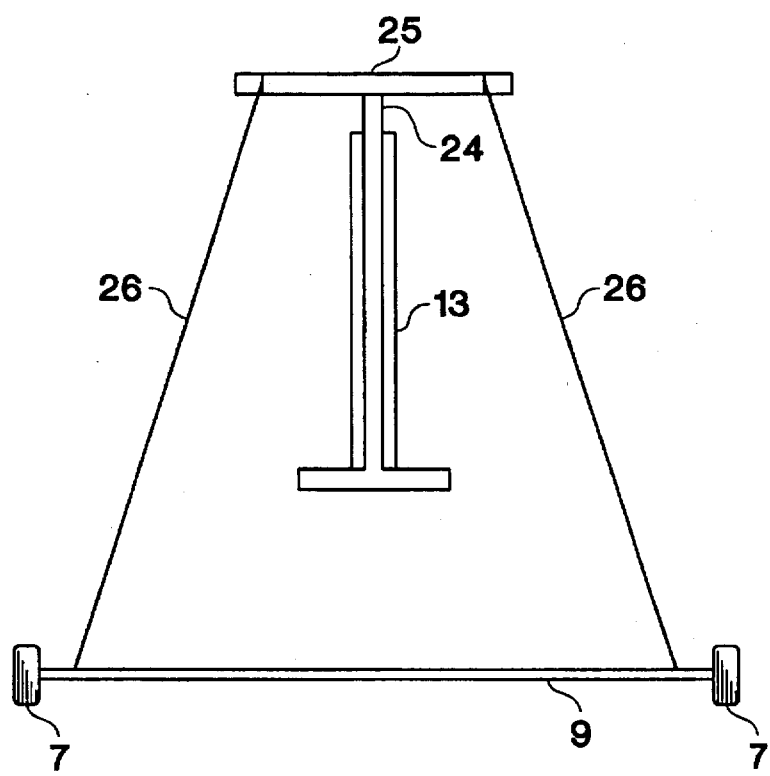
FIG. 4 shows a partial view of the steering mechanism.

Connected at opposite ends of the steering rod 25 are cables 26 (see FIG. 4) which attach to either end of the steering axle 9. When the steering shaft 24 is turned by the handle 14, the steering rod 25 will turn in the same direction. This will cause tension on one of the cables 26 (depending on which direction the handle is turned) and the cables will pull the axle 9. In this manner the swing powered vehicle can be steered.

Figure 3:
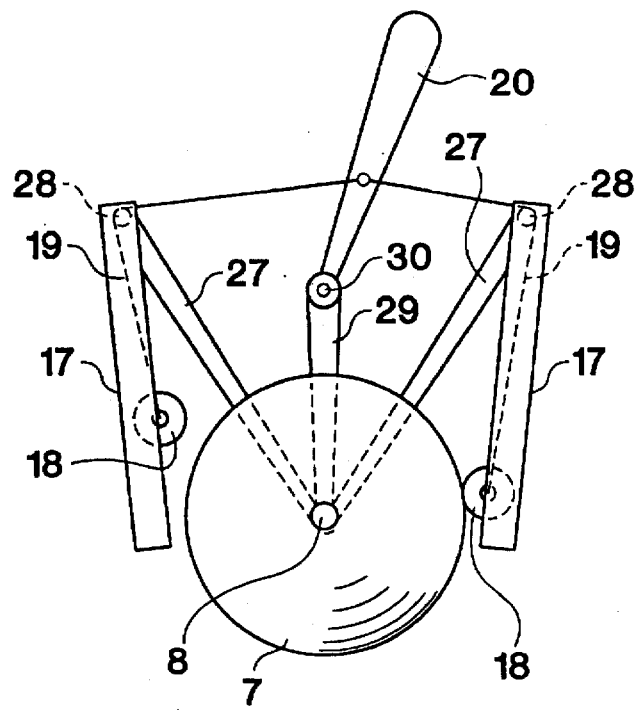
FIG. 3 shows an enlarged side view of a wheel and the preferred unidirectional braking device.

FIG. 3 depicts the preferred unidirectional braking mechanism, which can be attached at one or more of the wheels. This apparatus allows the wheels to spin in only one direction, thereby translating the swinging motion into forward or backward motion depending on the desire of the user. If the wheels were allowed to spin in both directions in a single swing, the result would be an oscillating back-and-forth motion with the vehicle staying in substantially the same position.

As shown in FIG. 3, two channel shaped guide members 17 are attached to the frame or the axle 8 by frame members 27, and angle down towards the front and back of one of the front wheels 7. Between the guide members 17 and the wheel 7 are cylinders 18 of sufficient diameter to form a wedge between the wheel 7 and the guide member 17. The cylinders are connected to cables 19, which slide through a ring or pulley 28 fixed at the top of the guide members 17. The cables 19 are connected to a lever 20 by any conventional means such as a bolt. The lever 20 is attached to the frame or axle by member 29. A simple pivot pin 30 allows the lever 20 to pivot with respect to member 29. Pulling the lever to the right, as seen in FIG. 3, lifts one of the cylinders 18 (the cylinder to the left of the wheel 7) up the guide member 17, allowing the wheel to spin in the direction of the lifted cylinder (counterclockwise); simultaneously, the other cylinder is lowered, by its own weigh and gravity, down the corresponding guide member 17, until it is wedged between the wheel 7 and the guide member 17. This wedging action will prevent clockwise movement of the wheel 7. The rider can therefore, by moving lever 20 in one direction or the other, change from forward to backward movement by alternately pulling and pushing the lever to raise and lower the opposing cylinders.

It should be noted that although wires or cables 19 are preferred for moving the cylinders 18, flexible rods could also be used. Also, instead of four wheels 7, the vehicle could use three wheels.

To use the invention, the occupant sits or stands on the seat 12, moves lever 20 and thereby selects a direction in which to move. The occupant then grasps the handle 14 and begins swinging as you would on a normal playground swing. The swinging motion gives the vehicle momentum in the direction that the wheels are free to move. The vehicle stays stationary during the back swing, if the back cylinder 18 is in the down position, since the wheels are prevented from moving by the cylinder 18 being wedged between the wheel 7 and the guide member 17. As the occupant begins to swing forward, the momentum of his/her weight moving in that direction will cause the vehicle to move forward, and the cycle will be repeated as long as the user continues to swing. On a forward swing the wedging cylinder 18 will be moved up the guide member 17, thereby allowing the wheel 7 to move. However, on the back swing the wedging cylinder 18 will be again caught between the wheel and the guide member due to the downward slant on the guide member. If the lever is in the opposite direction, the vehicle will move on the backward swing and will remain stationary on the forward swing.

The occupant can steer the vehicle by turning the handle 14, which will pull one of the cables 26, thereby turning the wheels 7 attached to the movable axle 9.

Although the swing-powered vehicle and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A swing powered vehicle comprising:

a frame comprising a pair of longitudinal members connected to a pair of transverse members, and a pair of upright frame members joined by an upper transverse member, a pair of axles connected to said frame, one of said axles being fixed and the other axle being movable, wheels attached to said axles, a seat means pivotally attached to said upper transverse member, steering means attached to said movable axle, braking means attached to at least one of said wheels which allows at least one of said wheels to move in only one direction, wherein said braking means comprises:

a pair of guide members attached on opposite sides of at least one of said wheels, a pair of cylinders movably attached between at least one of said wheels and said guide members, flexible means attached at one end to said cylinders, said flexible means attached at another end to a lever, whereby moving said lever in one direction will raise one of said pair of cylinders and lower the other of said cylinders, one of said cylinders when in the lowered position will be wedged between said wheel and one of said guide members, whereby said wheel will not be able to turn in the direction of said wedged cylinder.

* * * * *